March 13, 1962     P. DÜTTMANN     3,025,025
PROPULSION SYSTEM FOR AIRPLANES
Filed April 28, 1960
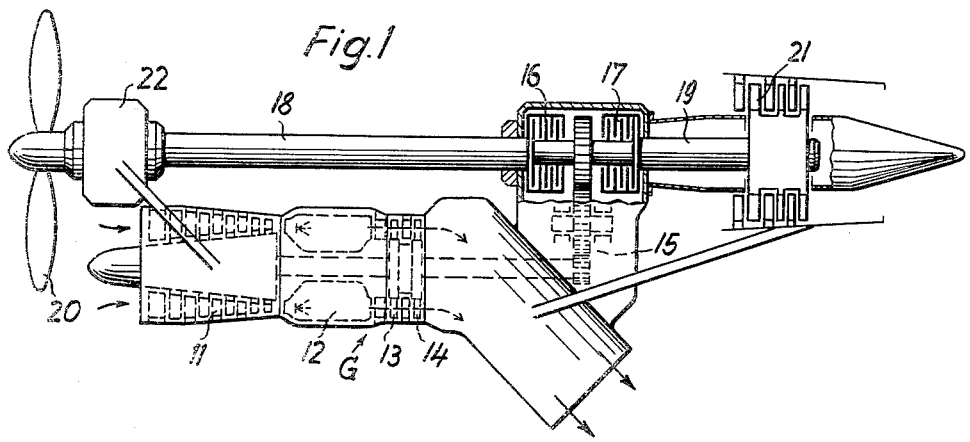
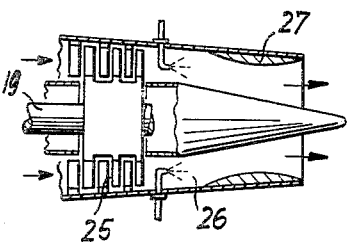
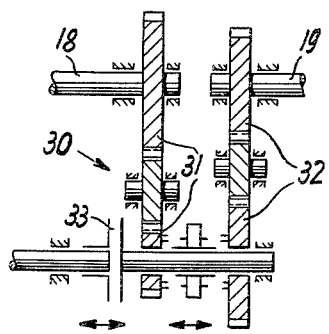
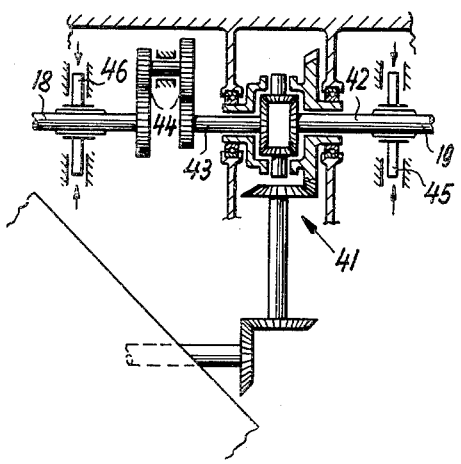
INVENTOR
PETER DÜTTMANN
ATTORNEYS

United States Patent Office 3,025,025
Patented Mar. 13, 1962

3,025,025
PROPULSION SYSTEM FOR AIRPLANES
Peter Düttmann, Rommelshausen i.R., Germany, assignor to Daimler-Benz Aktiengesellschaft, Stuttgart-Unterturkheim, Germany
Filed Apr. 28, 1960, Ser. No. 25,299
Claims priority, application Germany May 2, 1959
10 Claims. (Cl. 244—62)

The present invention relates to a propulsion system for airplanes which comprises a gas turbine engine including a compressor and a turbine for driving the same, and a propulsion turbine which is preferably gas-driven and mechanically not connected to the compressor turbine, and adapted to drive a propeller.

It is a well-known fact that, at low speeds, and especially at the take-off, propeller-driven airplanes have a very high propulsion efficiency and a high take-off thrust at a relatively low fuel consumption, and that, as the air speed increases, the propulsion efficiency of such airplanes decreases rapidly so that they are limited to relatively low speeds of about 700 to 800 km. per hour.

Aside from the basic form of a turboprop airplane engine, there are the so-called double-flow turbo jets which utilize the higher propulsion efficiency of the propeller at low air speed as compared with that of purely jet-driven gas turbine engines. In one known type of double-flow turbo jets, a gas-driven turbine fan wheel is mounted behind a main engine of the usual kind consisting of a compressor, combustion chambers, and a turbine for driving the compressor, all of which are arranged coaxially behind each other. This turbine fan wheel consists of a radially inner turbine fan which is directly acted upon by the fuel gas current of the main engine, and of a radially outer compressor fan which draws in the outer air and conveys the same in the form of a cold-air jacket around the hot fuel gas current in order to attain the mentioned purpose of increasing the take-off thrust of the engine and of reducing the consumption of fuel by a considerable increase of the rate of air flow through the entire engine at a simultaneous reduction of the medium discharge velocity.

It is an object of the present invention to provide a new conception of airplane propulsion which consists of avoiding the individual disadvantages of the two mentioned types of propulsion and combining their advantages, namely, the advantage of using a propeller in the lower speed range and the advantage of using a turbofan of a higher discharge velocity within the range of higher air speeds with the result of a higher propulsion efficiency.

For attaining this object, the invention provides a gas turbine engine in combination with a propeller which is driven in the lower air-speed range of up to 700 or 800 km. per hour, as well as in combination with a propulsion unit in the form of a turbofan which is driven in place of the propeller in the higher air-speed range above 700 to 800 km. per hour and which may consist either of a turbofan which is running in the free air or of one which consists of a compressor which is provided with a subsequent fuel injection and combustion stage.

The invention further provides for a suitable clutch or a pair of clutches which permit the driving power of the engine to be connected by means of an intermediate gear either to the propeller or to theturbofan.

In place of such clutches in combination with spur gears it is also possible according to the invention to provide a differential gear which is driven by the engine and drives a pair of shafts, one of which leads to the propeller or to the reduction gear thereof and the other to the turbofan of either of the mentioned types, and further to provide a suitable pair of brakes which are adapted to be applied upon one shaft or the other to stop the same.

According to the invention it is further possible to provide several gas turbine engines in the same airplane and to combine them to drive one turbofan.

These and further objects, features, and advantages of the present invention will become more apparent from the following detailed description thereof, particularly when the same is read with reference to the accompanying drawings, in which:

FIGURE 1 shows a diagrammatical illustration, partly in cross section, of a gas turbine engine in combination with a propeller drive and a turbofan running in free air;

FIGURE 2 shows a diagrammatic view, partly in cross section of a turbofan consisting of a compressor with a subsequent fuel injection and combustion stage, which is to be used in place of the turbofan according to FIGURE 1;

FIGURE 3 shows a diagrammatic cross section of a modification of the intermediate gear between the engine drive shaft and the shafts for driving the propeller and the turbofan according to FIGURES 1 or 2; while FIGURE 4 shows a diagrammatic cross section of another modification of the intermediate gear in the form of a differential gear.

The gas turbine engine G, as indicated diagrammatically in FIGURE 1, consists primarily of a compressor 11, one or more combustion chambers 12, a turbine 13 for driving the compressor 11, and a propulsion turbine 14 which drives an intermediate gear 15, the driven shaft of which may, in turn, be connected by a suitable clutch 16 or 17 either to the propeller drive shaft 18 or to the drive shaft 19 of a turbofan. Thus, in the lower speed range of 0 to about 800 km. per hour, clutch 16 may be engaged so that the airplane will be driven by the propeller 20 through its reduction gear 22, while above 800 km. per hour to approximately the velocity of sound or slightly beyond, clutch 16 will be disengaged and clutch 17 will instead be engaged so that turbofan 21 will then carry out the propulsion of the airplane. Clutches 16 and 17 may be operated either by hand or automatically by any suitable means which are not shown as they are well-known in the art.

According to the modification as illustrated in FIGURE 2, the turbofan is formed by a compressor 25 which is followed by a subsequent fuel injection and combustion stage 26 and a thrust nozzle 27. By means of such a compressor 25 with a subsequent combustion stage 26 and a thrust nozzle 27, and driven by a gas turbine engine G, it is possible to attain very high speeds.

Instead of providing a gear and clutch assembly 15, 16, 17 as shown in FIGURE 1, it is also possible to provide an intermediate gear 30 according to FIGURE 3 which consists of two parallel sets of gears 31 and 32 which are driven by the engine G, as shown in FIGURE 1, through a clutch 33. The set of gears 31 for driving the propeller shaft 18 forms a reduction gear for reducing the speed considerably, while the set of gears 32 which drives the turbofan shaft 19 reduces the speed only slightly or not at all. This type of speed transmission may be preferred for the purpose of reducing the high speed of the propulsion turbine 14 to a greater extent for driving the propeller shaft 18 and the propeller 20, while for driving the turbofan 21 or 25 only a smaller speed reduction, if any, is usually desired, as it should run at the highest possible speeds.

FIGURE 4 illustrates a further modification of the intermediate gear in the form of a differential gear 41 with two driven shafts 42 and 43. Shaft 42 is adapted to drive the turbofan 21 or 25, while shaft 43 drives the propeller 20, preferably through a reduction gear 44. Shafts 42 and 43 may be alternately blocked by brakes 45 and 46, respectively. The provision of such a differential gear 41 has the advantage that it allows a very gradual and smooth shifting of the driving power from one propulsion unit to the other.

Although this invention has been illustrated and described with reference to the preferred embodiments thereof, it should be understood that it is in no way limited to the details of such embodiments, but is capable of numerous modifications within the scope of the appended claims.

The invention having now been fully disclosed, what is claimed is:

1. A propulsion system for airplanes comprising, in combination, a gas turbine engine having a compressor, a turbine for driving said compressor, and a propulsion turbine having a shaft, a propeller having a shaft, a turbofan having a shaft, and means for connecting the shaft of said propulsion turbine to said propeller shaft and disconnecting it from said turbofan shaft for driving an airplane within a lower air-speed range, and for connecting the shaft of said propulsion turbine to said turbofan shaft and disconnecting it from said propeller shaft for driving the airplane within a higher air-speed range.

2. A propulsion system as defined in claim 1, in which said turbofan is running in free air.

3. A propulsion system as defined in claim 1, in which said turbofan comprises a compressor and a subsequent fuel injector and combustion stage.

4. A propulsion system as defined in claim 1, in which a plurality of said gas turbine engines are provided, and means for mechanically connecting said engines at least to said turbofan.

5. A propulsion system as defined in claim 1, in which said propeller and turbofan shafts extend parallel to said turbine shaft, said connecting and disconnecting means comprising an intermediate gear connected to said turbine shaft, and at least one clutch for alternately connecting said intermediate gear to said propeller shaft and to said turbofan shaft.

6. A propulsion system as defined in claim 5, further comprising a speed-reduction gear interposed between said propeller shaft and said propeller.

7. A propulsion system as defined in claim 5, in which said propeller and turbofan shafts extend coaxially with each other.

8. A propulsion system as defined in claim 5, in which each of said propeller and turbofan shafts is adapted to be alternately connected to said intermediate gear by a separate clutch.

9. A propulsion system as defined in claim 1, in which said connecting and disconnecting means comprise a clutch, a speed-reduction gear connected to said propeller shaft, and an intermediate gear connected to said turbofan shaft, and means for connecting said clutch to said turbine shaft and alternately to said speed-reduction gear and said intermediate gear.

10. A propulsion system for airplanes comprising a gas turbine engine including a compressor with an associated driving turbine and a propulsion engine, a propeller, blower means, and means connecting said propulsion turbine to said propeller and disconnecting it from said blower means for driving an aircraft within a low air speed range, and for connecting said propulsion turbine to said blower means and disconnecting it from said propeller for driving the airplane in a higher air speed range, said connecting and disconnecting means including a shaft connected to said turbine, differential gear means operatively engaging said turbine shaft adjacent one end thereof, shaft means connecting said differential gear means with said propeller, reduction gear means operatively associated with said shaft means of said propeller, shaft mean interconnecting said differential gear and said blower means, and brake means for selectively stopping each of said shaft means.

References Cited in the file of this patent

UNITED STATES PATENTS

| | | |
|---|---|---|
| 2,735,499 | Ehlers | Feb. 21, 1956 |
| 2,912,823 | Lawson | Nov. 17, 1959 |
| 2,920,843 | Ferri | Jan. 12, 1960 |